United States Patent [19]
Brandstetter

[11] Patent Number: 6,091,523
[45] Date of Patent: Jul. 18, 2000

[54] MULTI-CHANNEL RECEIVER

[75] Inventor: Robert W. Brandstetter, Levittown, N.Y.

[73] Assignee: Northrop Grumman Corporation, Los Angeles, Calif.

[21] Appl. No.: 07/307,763

[22] Filed: Feb. 7, 1989

[51] Int. Cl.⁷ .......................... G02B 27/46; G06G 7/195
[52] U.S. Cl. ...................... 359/111; 356/349; 364/822; 359/308; 342/58
[58] Field of Search ................ 350/162.12, 162.15, 350/317; 356/349; 364/822

[56] References Cited

U.S. PATENT DOCUMENTS

| | | | |
|---|---|---|---|
| 2,451,465 | 10/1948 | Barney | 250/550 |
| 2,643,286 | 6/1953 | Huruitz | 324/77 K |
| 3,055,258 | 9/1962 | Huruitz | 356/308 |
| 3,088,113 | 4/1963 | Rosenthal | 342/189 |
| 3,204,248 | 8/1965 | Alexander | 346/108 |
| 3,220,003 | 11/1965 | Montague, III et al. | 342/132 |
| 3,302,027 | 1/1967 | Fried et al. | 356/349 |
| 3,355,579 | 11/1967 | Robertson | 364/822 |
| 3,430,047 | 2/1969 | Hurkamp | 250/199 |
| 3,430,240 | 2/1969 | Loesch | 342/201 |
| 3,482,102 | 12/1969 | Thomas | 250/201 |
| 3,636,330 | 1/1972 | Holeman et al. | 235/150.27 |
| 3,671,106 | 6/1972 | Groh | 350/162.12 |
| 3,698,787 | 10/1972 | Mueller et al. | 350/3.62 |
| 3,699,347 | 10/1972 | Buchan et al. | 250/550 |
| 3,700,902 | 10/1972 | Buchan et al. | 250/201 |
| 3,816,735 | 6/1974 | Bromley | 235/181 |
| 3,821,548 | 6/1974 | Jernigan | 250/216 |
| 3,977,771 | 8/1976 | Horner | 350/162.12 |
| 4,060,316 | 11/1977 | Pollack et al. | 353/20 |
| 4,071,907 | 1/1978 | Casarent | 364/822 |
| 4,108,538 | 8/1978 | Felstead | 350/162.12 |
| 4,365,310 | 12/1982 | Green | 364/822 |
| 4,421,379 | 12/1983 | Grumet et al. | 350/3.72 |
| 4,468,093 | 8/1984 | Brown | 350/162.12 |
| 4,522,466 | 6/1985 | Lindig et al. | 350/162.12 |
| 4,569,588 | 2/1986 | Nishiwaki et al. | 356/28.5 |
| 4,597,630 | 7/1986 | Brandstetter et al. | 350/3.83 |
| 4,645,300 | 2/1987 | Brandstetter et al. | 350/162.12 |
| 4,699,466 | 10/1987 | Brandstetter et al. | 350/162.12 |

OTHER PUBLICATIONS

William T. Rhodes, "Acousto—Optic Signal Processing: Convolution and Correlation", Proceedings of the IEEE, vol. 69, No. 1, Jan. 1981, pp. 65–79.

*Primary Examiner*—Nelson Moskowitz
*Attorney, Agent, or Firm*—Terry J. Anderson; Karl J. Hoch, Jr.

[57] ABSTRACT

A multi-channel receiver which exploites the parallel processing advantages of an optical signal processor is used to facilitate 100 percent intercept of an incoming RF signal in a dense RF environment. The receiver performs real time parallel signal processing to effectively capture a given signal of interest. The receiver modulates a laser beam with incoming RF signals. The modulated laser beam is then Fourier transformed, channelized into an array of signals of varying frequencies, optically filtered and then down converted into their original radio frequencies with only the pass characteristics altered so that the captured signal can be readily identified. An electronic controller is used to control the pass structure of the optical filter which can be reconfigured in real time to selectively pass signals having the desired characteristics.

23 Claims, 3 Drawing Sheets

MULTI-CHANNEL RECEIVER

BACKGROUND OF THE INVENTION

1. Field of the Invention

This invention relates to optical information processing and, more particularly, to the sorting and classification of radio frequency signals and the excision of interference.

2. Discussion of the Prior Art

A given signal waveform usually consists of the signal of interest and interference. The signal and interference composite is a current or voltage waveform which is a function of time. Usually, only the signal without interference is of concern, and more specifically, only certain frequencies of the given signal are of concern; therefore, it is necessary to extract the useful information and isolate the desired frequencies from the composite signal.

A receiver has the job of extracting source information from a received modulated signal which has in some form been corrupted by interference. A modulated signal is originally a bandpass signal with a given carrier frequency that has been encoded with source information by the process of modulation. Standard receivers employ the superheterodyne receiving technique. This technique consists of either up-converting or down-converting the input signal to some convenient frequency band, and then extracting the encoded information by using the appropriate detector. Filtering in the superheterodyne receiver is done at the original radio frequency and at the up or down converted frequency.

It has been shown that maximum probability of detection of a signal occurs when it is processed with a matched filter. Basically, the purpose of a matched filter is to characterize an incoming waveform based on a predetermined signal waveshape as determined by the transfer function of the matched filter. In other words, a matched filter is used to detect the presence of a particular signal based on the characteristics of that particular signal. The objective of a matched filter system is to weight the input signal waveform and filter the interference so that at the sampling time the output signal level will be as large as possible with respect to the Root Mean Square (RMS) of the output noise level. A matched filter is therefore a linear filter that minimizes the noise level while maximizing the signal level. In applications employing matched filter filtering systems, the signal may or may not be present, but if it is present, its waveshape must be completely or nearly completely characterized. When the waveshape is not known, or not completely characterized, a search for a signal generally means that conditions for intercept will be less than ideal. That is, the filter pass band must be large enough to pass all frequencies of all possible signals with the most generalized response, clearly not a matched filter.

Broadband receivers often have to function in dense signal and noise environments. The job of a filtering system or receiver is to sort, classify and remove interference, such as noise, from signals of interest (SOI). The interference may be characterized as noise from the outside world and disturbances from the electronic components as well as mechanical components of the system itself. To enhance the filtering function it would be highly desirable to perform real-time parallel signal processing to effectively channelize and remove unwanted spectra from the SOI's. This would in effect transform a single channel that is corrupted with unwanted signals, interference and noise to a specific number of discrete channels where each is tailored to selected SOI's.

The accepted practice has been to electronically filter the given signals. It has been found, however, that electronic filtering means have a number of distinct disadvantages. Inherent in electronic filters is the problem of phase distortion and non-linear effects. In addition, electronic filters are also susceptable to noise corruption; therefore, other techniques such as optical filtering of signals have increasingly become of interest.

The prior art shows a number of examples of optical systems for the detection and/or removal of interference and unwanted frequencies from given SOI's. U.S. Pat. No. 4,645,300, assigned to the same assignee as the present invention, discloses a Fourier Plane Recursive Optical Filter which is used to recursively pass a given signal beam a multiplicity of times through a single optical spatial filter such that the attenuation of unwanted signal frequencies is multiplied. However, the aforementioned invention does not exploit the advantages of parallel processing.

U.S. Pat. No. 3,671,106, discloses an Optical Multiplex Filter System which is used for optical data processing. The object of the invention is to distribute data over a large number of parallel transmission channels in which the data passes through optical filters that process the data in a described manner. However, the aforementioned invention does not provide the filtered signals at their original radio frequencies.

U.S. Pat. No. 4,699,466, assigned to the same assignee as the present invention, discloses an Optical RF Filtering System which is used as an optical notching filter in which a band of radio frequencies such as the RF input of a radio receiver is an input signal. This invention provides adaptive programmable spatial filtering techniques in which an optical filter is programmed to notch out spikes. However, the aforementioned patent does not provide matched filter capabilities.

SUMMARY OF THE INVENTION

The present invention is directed to a multi-channel receiver system for processing large numbers of signals in real time by modulating a coherent optical radiation beam with incoming RF signals, channelizing the signals and providing adaptive real-time filtering. The adaptive real-time filtering is accomplished through the use of an electronic controller which has the capability to automatically or interactively control various parameters of the filters. The incoming RF signals are modulated onto a carrier laser beam by means of an acousto-optic modulator. The resulting modulated RF signals are Fourier transformed and channelized to produce nxm number of discrete channels of the RF spectra. The nxm channels of the RF spectra are then passed through a beam splitting means in order to produce two identical arrays of the RF spectra. Each array is then passed through an identical programmable spatial filter (PSF). Each PSF is used to adaptively filter the incoming signal array by physically blocking unwanted frequencies. The filtered signal arrays are then down converted to their original radio frequencies by means of optical heterodyning. One down converted signal array is available for further processing such as in signal detection networks or for archival recording of the filtering signal for dissementation to other systems, while the other array is used by an operator or automatic controller. The operator or automatic controller can structure each channel of the programmable spatial filter with any desired strategy to maximize detection of the signal in real-time. The particular strategy can be preprogrammed to try frequency scans over a specific frequency range, or real time operator instructions can be utilized to try different filter frequencies or shapes. The electronic controller configures the programmable spatial filters in order to achieve matched filter operation at the receiver.

The multi-channel receiver system of the present invention provides for the detection and classification of an incoming band of signals by dedicating an optical channel for each specific SOI intercept. The multi-channel receiver of the present invention approaches 100 percent SOI intercept probability by providing a selected number of responses throughout an operating band where matching the response to the signal would come closer to an ideal matched filter.

The multi-channel receiver can be used for intelligence gathering and recording and for sorting and filtering through radio frequency spectra to reduce bottlenecks in downstream serial processing.

BRIEF DESCRIPTION OF THE DRAWINGS

For the purpose of illustrating the invention, there is shown in the drawings the forms which are presently preferred; however, it should be understood that the invention is not necessarily limited to the precise arrangements and instrumentalities here shown.

DESCRIPTION OF THE PREFERRED EMBODIMENT

The multi-channel receiver system of the present invention optically filters and classifies incoming radio frequency (RF) signals by dedicating a channel for each specific signal of interest (SOI) and selectively rejecting unwanted frequencies and noise. In the multi-channel receiver system, a beam of substantially coherent light is modulated by a spectrum of RF SOI's and transformed into the Fourier domain. The modulated light beam is channelized into a plurality of channels, each corresponding to a preselected RF spectral component of the spectrum of interest. The resulting channelized signals are then divided into two identical arrays of the RF spectra. Each array is then passed through identical programmable spatial filters. The programmable spatial filters are used to selectively reject unwanted frequencies and interference. The two arrays of filtered RF spectra are then down converted to their original radio frequencies by means of optical heterodyning. One array of down converted signals is available for further signal processing systems or archival recording, while the other array is directed a to control system that can structure each channel of the programmable spatial filters with a particular strategy to maximize detection of the signal of interest.

Figure 1:
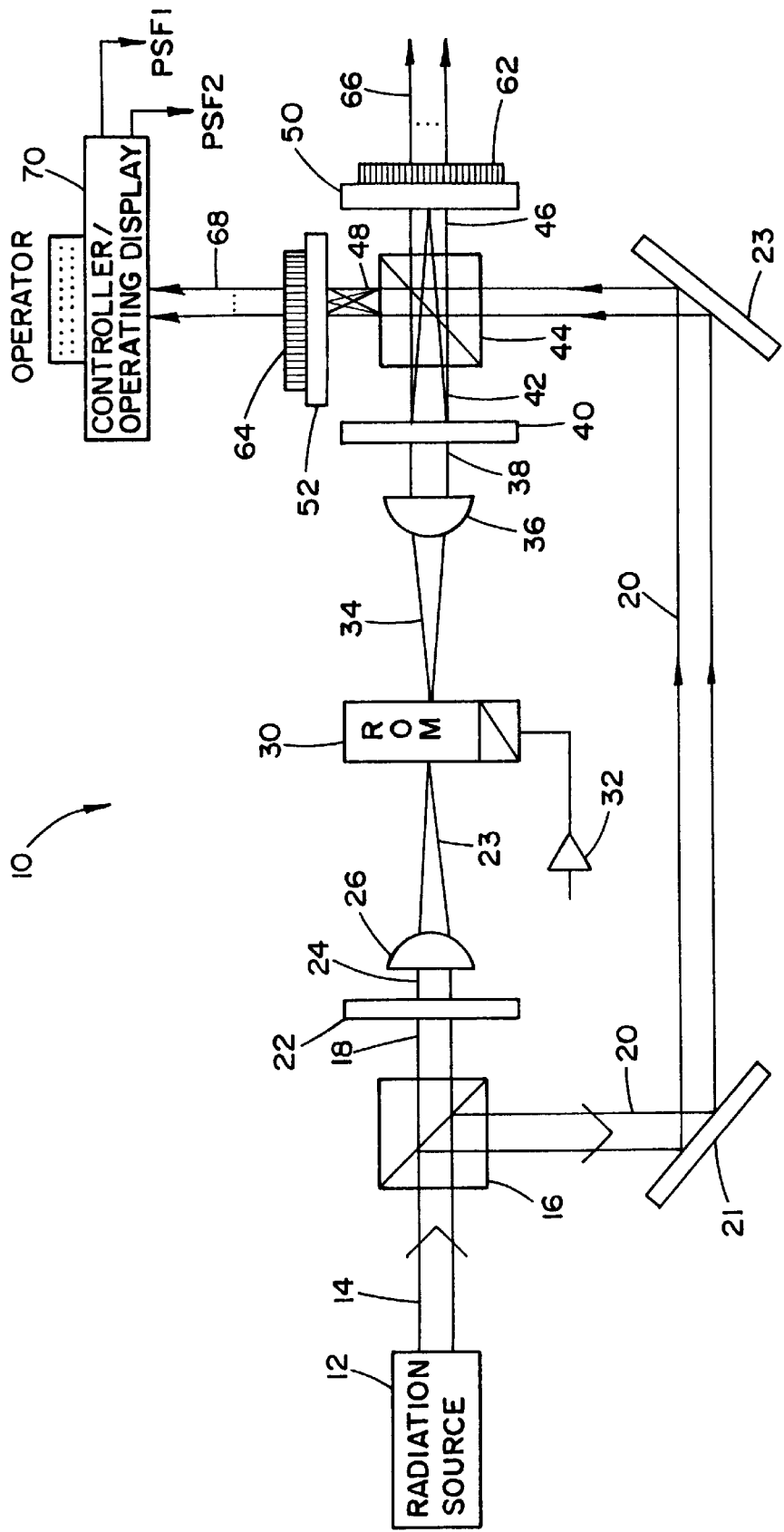
FIG. 1 is a block diagram of the multi-channel receiver system of the present invention.

Referring now to FIG. 1, there is shown a schematic diagram illustrating the multi-channel receiver 10 architecture. An electromagnetic radiation source 12 produces a substantially coherent electromagnetic radiation wave or light beam 14 with a given wave length. The electromagnetic radiation source 12 can be a gas laser such as a helium neon gas laser or a semiconductor laser such as a laser diode. Operating efficiency is greater with single-frequency laser operation which can be obtained with most semiconductor lasers, or if a gas laser is used that does not provide acceptable single-frequency laser operation, an intra or extra cavity Farby Perot interferometer structure can be added.

The substantially coherent electromagnetic radiation light beam 14 is passed through a first beam splitter 16 in order to produce two beams 18 and 20 from the one incoming beam. Beam 18 is used as the carrier beam in the filtering system and beam 20 is used as a local oscillator beam in the down conversion process. Alternatively, the zero order term of acousto-optic modulator (AOM) 30 can be extracted at the output of the AOM 30 and used as the local oscillator beam 20. The principles of operation of the AOM 30 will be described below. The carrier beam 18 is then passed through a wave plate 22 in order to adjust the polarization of the incoming beam 18. It should be noted that the various components of the multi-channel receiver system affect the polarization of the radiation; therefore, it is necessary to maintain the equivalent polarization throughout the device in order to ensure proper down conversion. The properly polarized light beam 24 is then brought incident onto a cylindrical lens 26 in order to develop a one-dimensional sheet beam 28 for entrance into the AOM 30.

The AOM 30 is a complex light modulator which transforms a radio frequency signal to an acoustic wave which modulates the refractive index of the optical material, thereby producing a phase modulated medium manifested periodic with the radio frequency signal. The modulated medium appears to the incident laser beam as a dynamic phase grating which produces a zero order signal, a first order signal, and depending upon operating regions sometimes higher orders, emerging as an exciting beam where angular deflection is proportional to the radio frequency signal. When light from a radiation source is transmitted at an appropriate angle through a medium which is transparent to light and through which an ultrasonic wave is propagated and the refractive index of the medium is varied periodically with time, the light is diffracted. At this time, the frequency of the light beam is shifted by the number of vibrations of the ultrasonic wave. This is accomplished when an incoming RF signal produces an electric field across a transducer (i.e. piezoelectric crystal transducer) which creates a strain proportional to the incoming RF signal. This strain is the aforementioned ultrasonic wave. The result most closely resembles a narrow band phase modulated signal. A Bragg Cell may be used for imposing the RF signal spectral intellegence on the carrier beam 26 in the form of narrow beam phase modulation. If a Bragg Cell is used for the AOM 30, it typically comprises an optical medium such as a crystal element driven by an appropriate transducer. A further description of the AOM 30 is given in U.S. Pat. No. 4,699,466 assigned to the same assignee as the present invention and incorporated herein by reference.

In the receiver system of the invention, an RF signal is brought into the AOM 30 by an RF amplifier 32. The output of the AOM 30 is a narrow band phase modulated beam 34 that is the first order signal. The modulated beam 34 is then input to a second cylindrical lens 36 in order to develop a two-dimensional sheet beam 38. The two-dimensional sheet beam 38 is directed to a multiple holographic lens (MHL) 40. The MHL 40 is fabricated in a known manner such as that described in U.S. Pat. No. 4,421,379 assigned to the same assignee as the present invention. The MHL 40 divides the modulated sheet beam 38 into a plurality of distinct channels in the form of an array 42. In addition, the MHL 40 performs an optical Fourier transform of the incident modulated beam 38, so that the array of channels contain the spectra of the original incoming RF signal.

The array of transformed beams or RF spectra 42, now in the spatial frequency domain, are then directed into a beam splitter/combiner 44, which is an optical cube, where it is summed with the local oscillator beam 20 and split into two identical arrays 46 and 48 for further processing. The beam 20 is directed to the beam splitter/combiner 44 by reflective elements, such as mirrors 21 and 23 respectively. The composite arrays 46 and 48 each pass through programmable spatial filters 50 and 52 respectively.

Figure 2:
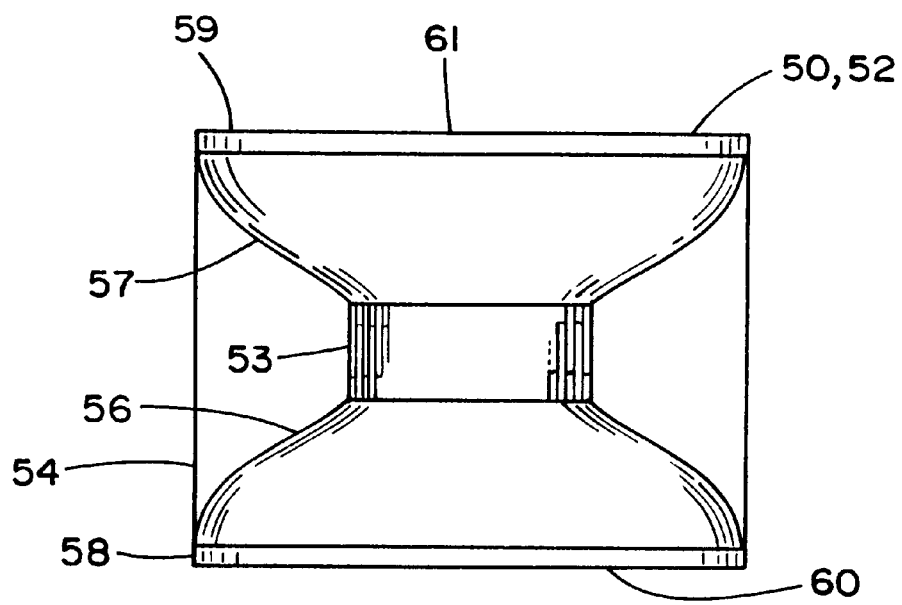
FIG. 2 is a schematic diagram of a programmable spatial filter embodied in the invention.
Figure 3:
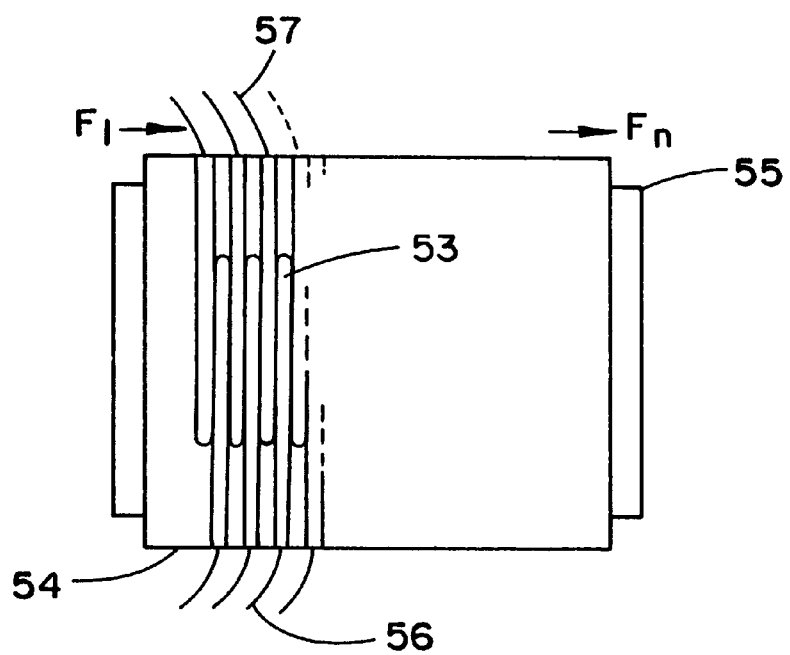
FIG. 3 is a schematic diagram showing the liquid crystal filter elements of the filter of FIG. 2 in greater detail.

In one embodiment, each of the PSF's 50 and 52 is essentially a comb filter (see FIGS. 2 and 3) having liquid crystal teeth like columns or segments 53 arranged linearly on a suitable transparent plate 54 having a transparent backplane 55 in the path of the transformed radiation passing through the beam splitter/combiner 44. Each liquid crystal segment or element 53 is connected by means of conductors 56 and 57 to terminals 58 and 59 on the edges 60 and 61 respectively of plate 54 such that connections can be made thereto for passing an electric current selectively through the segments. Terminals 58 and 59 are suitably plugged into terminating means (not shown) in electrical conduit 60 such that the PSF's 50 and 52 are in circuit with the electronic controller 70. Different types of liquid crystal materials are available to obtain a variety of effects. The elements can be activated to block a signal or deactivated to pass the signal. Each channel of the PSF 50 and 52 is specifically tailored for each incoming signal of interest. Specifically, the pass characteristics of each PSF can be formed for narrowband, broadband, discontinuous and disjoint spectra as well as for notching or passing spectral bands. The PSF's 50 and 52 can be reconfigured or re-programmed in near real-time (as fast as the photoconductive surfaces's permit) either remotely or on site.

In the PSF, each segment or element corresponds to a narrow RF frequency band. In a practical embodiment of the invention, 256 segments which can be selectively activated, as required, in any combination, are provided. It will be appreciated that a number of segments greater or fewer than 256 can be provided if the application so dictates. When not activated, the PSF is highly transmissive optically and passes incident radiation substantially unchanged to the photomixer arrays. However, when a segment is activated by an electrical signal from the filter activation system, the change in alignment of the constituent crystals in the liquid crystal due to the imposed electrical field renders the element opaque. This blocks the passage of light therethrough to thus notch out radiation of a narrow frequency band of the signal spectrum. In liquid crystals, as is well known, optical attenuation is achieved by cross-polarization, or scattering, or the like. To simplify the explanation of the invention, however, the liquid crystal segments will be said to have been rendered opaque by the imposition of an electrical field thereon irrespective of the phenomenon, whether it be scattering or the like, that is actually involved in the optical attenuation. U.S. Pat. No. 4,699,466 assigned to the same assignee as the present invention contains a description of the use and operation of a PSF as an optical notching filter.

Referring again to FIG. 1, the filtered composite beam arrays 46 and 48 are down converted at detectors 62 and 64, which are mated with the respective PSF 50 and 52. The actual down conversion is done optically and is well known in the art. The local oscillator (LO) beam 20 is summed with the modulated radiation beam 42 at the beam combiner 44. The filtered version of this composite beam is now down converted at the detectors 62 and 64, which may be photomixer arrays that respond as an intensity detector, squaring the sum of the light amplitude. The detectors 62 and 64, must be operatively associated preferably with a specific one of the linear liquid crystal segments or elements of the PSF's 50 and 52. The output arrays 66 and 68 of the detectors 62 and 64 contain a dc term proportional to each light intensity (LO and signal) and a RF term which corresponds to the difference in frequency of the LO beam 20 and the modulated radiation signal beam 42. The various channelized output signals 66 and 68 are available at the original radio frequencies with only the pass characteristics altered.

In another embodiment the detectors 62 and 64 are photo charged-coupled device (CCD) arrays. The CCD arrays 62 and 64 are composed of a linear arrangement of photosensitive CCD elements, the outputs of which are fed into a suitable sample and hold register in controller 70. As in the case with the photomixer arrays, each CCD element is operatively associated preferably with a specific one of the linear liquid crystal segments of the PSF's 50 and 52. Each CCD element will represent some specific frequency band of the spread frequency spectrum to the RF signal imposed by the AOM on the radiation beam and will be associated with a liquid crystal segment representing the same frequency band in the PSF.

The array of output signals 66 are in the form of responses that are available for further information processing by various detection and capture devices as well as many types of recording devices. The impulse responses of output array 68 are used by a controller 70 to adjust the programming of the PSF 50 and 52 to maximize the probability of signal detection.

The controller 70 can operate in an automatic mode or an interactive mode. In the interactive mode, an operator alters the characteristics of both PSF's 50 and 52 via the controller 70. Through the controller 70, the operator can display the filtered array of signals 48 in the frequency domain. In addition, the operator can annotate the various, parameters of the given signals. In other words, the operator has available quantitative as well as qualitative data available to him. Basically, the operator is viewing the power spectrum information of the given signals.

Based on the given data, the operator can alter the pass characteristics of both PSF's 50 and 52 through the controller 70 and then view the results through the display of the controller 70. The controller 70 can change both the frequency and amplitude of all signals in the arrays 46 and 48. By continuously monitoring the display, the operator can in real time adjust the PSF's 50 and 52 for basically any type of pass structure since the PSF's 50 and 52 are in an electronically addressable architecture as mentioned previously.

In an automatic mode of operation, a computer or microprocessor can be programmed to sequentially try different filter patterns. The controller 70 would interface the PSF's 50 and 52 in an identical manner; however, instead of an operator dictating the filter patterns, they are preprogrammed into the computer or microprocessor. In addition to the sequential pattern, the controller 70 can be programmed to remove selected interferers above predetermined thresholds.

Figure 4:
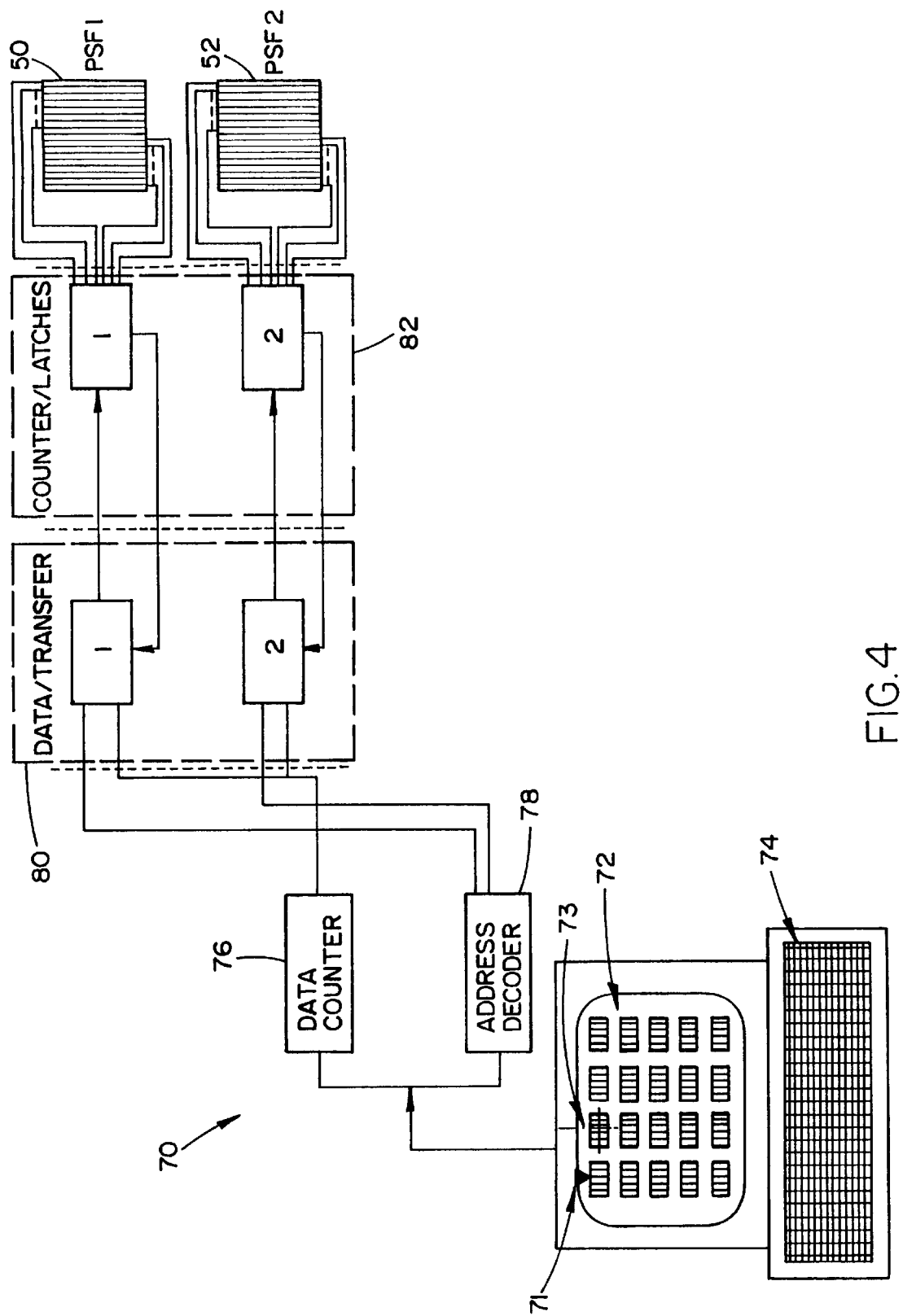
FIG. 4 is a block diagram of the control system employed by the multi-channel receiver system of the present invention.

Referring now to FIG. 4, controller 70 is shown in detail. A computer terminal 72 displays the location and status of each receiver channel and provides information on bandwidth, response and notches within that bandpass. By placing an index marker 71 and a cross-hair cursor 73 at a particular location on the screen, the particular PSF 52 channel and segment can be manipulated by an operator to control the above mentioned displayed parameters. The computer or microprocessor associated with terminal 72 and keyboard 74 contains a program that allows this type of manipulation. Basically, the computer program forms a matrix of the channels of the PSF 52 and forms specific commands based on entries into the keyboard 74. The generated commands which are based on operator instructions, contain an address and data word for each multi-channel receiver channel. For the purpose of explaining the operation of the controller 70, a command word is chosen to be 8 bits in length with 3 bits allocated for the address, and 5 bits for data. The number of bits chosen is dictated by the number of channels and the number of segments or fingers in each PSF 50 and 52. For example, a 3 bit address field would accomodate 9 channels whereas 6 bits would accomodate 64 channels, and a 5 bit data field would accomodate a 32 segment PSF whereas a 10 bit data field would accomodate a 1024 segment PSF.

The composite word or command is then separated into its component parts wherein the 5 data bits are routed to a 5 bit counter 76 and a 3 bit address decoder 78. The output of the 5 bit counter 76 and the output of the 3 bit address decoder 78 are then routed to a pair of data transfer devices 80, which are multiplexer circuits or holding registers. Basically, the output of the address decoder 78 is used to direct the data to the designated channel. The data is then transferred from the data transfer devices 80 into a pair of counters and latches 82. The data is used to set a counter whose output is latched to drive the segments of both PSF's 50 and 52 in accordance with the keyboard entry. The output of the counters and latches 82 are connected to the channels of both PSF's 50 and 52. It should be noted that in this embodiment of the controller of the multi-channel receiver, two PSF's are used; however, the controller can be configured to control more than two PSF's.

Although shown and described in what are believed to be the most practical and preferred embodiments, it is apparent that departures from specific methods and designs decribed and shown will suggest themselves to those skilled in the art and may be used without departing from the spirit and scope of the invention. The present invention in not restricted to the particular constructions described and illustrated, but should be constructed to cohere of all modifications that may fall within the scope of the appended claims.

What is claimed is:

1. A multi-channel optical receiver system comprising:
   means for modulating a substantially coherent light beam with an input RF signal;
   means for channelizing said RF modulated light beam into an array of channels, each channel containing a Fourier transform replica of the RF modulated light beam;
   means for combining said array of channels with a local oscillator light beam and for dividing said combined array into a first combined array and a second combined array;
   first and second programmable filter means for selectively passing signals in each channel of said first and second combined arrays respectively;
   first and second detector means for respectively converting the signals passed by said first and second programmable filter means into first and second electrical output signal arrays; and
   control means for programming said first and second filter means in response to said first electrical output signal array to selectively pass signals having selected characteristics.

2. The receiver system of claim 1 wherein said first and second filter means includes a plurality of elements, each element receiving one of said channels in the respective combined array incident upon said filter.

3. The receiver system of claim 2 wherein each element is programmable to pass signals having selected characteristics.

4. The receiver system of claim 3 wherein each of said elements is a liquid crystal, the crystalline structure of which changes its alignment under the influence of an electric field being applied to said element by said control means to render said elements opaque in selected locations to pass the selected signals.

5. The receiver system of claim 1 wherein said modulating means comprises an acousto-optical modulator.

6. The receiver system of claim 5 further including a source of said substantially coherent light beam.

7. The receiver system of claim 6 wherein said source of substantially coherent light is a laser.

8. The receiver system of claim 1 wherein said channelizing means comprises a multiple holographic lens for channelizeing and optically Fourier transforming said RF modulated light beam into an array of frequency domain signals.

9. The receiver system of claim 1 wherein said combining means is an optical cube for combining said local oscillator beam with said Fourier transformed replica of the RF modulated light beam array and subsequently dividing the composite beam into two sets of identical beam arrays.

10. The receiver system of claim 9 wherein said local oscillator beam is derived from said substantially coherent light beam.

11. The receiver system of claim 10 wherein said means for deriving said local oscillator beam is a beam splitting means.

12. The receiver system of claim 11 further including a first and second mirror means for directing said local oscillator beam to said beam combiner/divider.

13. The receiver system of claim 1 wherein said first and second detector means comprise a first and second photomixer array.

14. The receiver system of claim 1 wherein said first and second detector means comprise a first and second charge-coupled device.

15. The receiver system of claim 1 wherein said controlling means comprises:
   an electronic controller which interfaces with said first and second programmable filter means and supplies electrical signals to said first and second filter means to render said filter elements opaque in selected locations to block selected signals and to render said filter elements transparent in selected locations to pass selected signals;
   a display means which displays graphic and alphanumeric data representing said filtered Fourier transformed replica of the RF modulated light beam arrays;
   a microprocessor which automatically controls said electronic controller based on preprogrammed instructions; and
   a keyboard means, which interfaces with said electronic controller for supplying commands to said first and second filter means.

16. The receiver system of claim 15 wherein said controlling means further includes a command processing means which comprises:
   a data counter means for storing a data field which represents a specific segment of said first and second filter means;

an address decoder means which decodes an address field which represents a specific channel of said first and second filter means;

a data transfer means for storing and shifting said data and address field; and a counter and latching means for decoding said data field and latching the output to drive the specific segments and specific channels of said first and second filter means.

17. A method of receiving incoming RF spectra comprising:

modulating a substantially coherent light beam with an input RF signal;

channelizing said RF modulated light beam into an array of channels, each channel containing a Fourier transform replica of the RF modulated light beam;

filtering said Fourier transform replica of the RF modulated light beam through first and second programmable filter means;

converting the signals passed by said first and second programmable filter means into first and second electrical output signal arrays; and controlling said first and second filter means in response to the first of said first and second electrical output signal arrays to selectively pass signals having selected characteristics.

18. The method of claim 17 wherein said filtering step includes passing all of the light beams in array of said Fourier transform replica of the RF modulated light beam that have selected characteristics.

19. The method of claim 17 wherein said channelizing step includes passing said modulated light beam through a multiple holographic lens which Fourier transforms said modulated light beam and creates an array of channels.

20. The method of claim 17 wherein said converting step comprises:

combining said filtered Fourier transform replica of the RF modulated light beam with a local oscillator light beam to form a composite beam; and detecting said composite beam array and producing an array of RF signals.

21. The method of claim 20 further including deriving said local oscillator beam from said substantially coherent light beam.

22. The method of claim 17 wherein said controlling step comprises:

electronic controlling of said first and second programmable filter means to render said filter elements opaque in selected locations to block selected signals and to render said filter elements transparent in selected locations to pass selected signals;

displaying graphic and alphanumeric data representing said filtered Fourier transformed replica of the RF modulated light beam arrays.

23. The method of claim 22 wherein said controlling step further comprises:

storing a data field which represents a specific segment of said first and second programmable filter means;

decoding an address field which represents a specific channel of said first and second programmable filter means;

transferring and storing said data and address fields; and counting and latching said data and address fields to drive said first and second programmable filter means.

* * * * *